US007406395B2

United States Patent
Wu et al.

(10) Patent No.: US 7,406,395 B2
(45) Date of Patent: Jul. 29, 2008

(54) METHOD AND SYSTEM FOR MEASURING GEOMETRICAL CHARACTERS OF A FIGURE

(75) Inventors: Xin-Yuan Wu, Shenzhen (CN); Chih-Kuang Chang, Tu-Cheng (TW)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 135 days.

(21) Appl. No.: 11/299,399

(22) Filed: Dec. 12, 2005

(65) Prior Publication Data

US 2006/0126917 A1 Jun. 15, 2006

(30) Foreign Application Priority Data

Dec. 10, 2004 (TW) .............................. 93138250 A

(51) Int. Cl.
*G01B 3/22* (2006.01)
(52) U.S. Cl. ...................................... 702/167
(58) Field of Classification Search ................. 702/167
See application file for complete search history.

(56) References Cited

U.S. PATENT DOCUMENTS

| 5,465,221 | A  | * | 11/1995 | Merat et al. .................... 702/83 |
| 6,738,727 | B2 | * | 5/2004  | Chang .......................... 702/167 |
| 6,922,234 | B2 | * | 7/2005  | Hoffman et al. .......... 356/141.1 |
| 7,203,634 | B2 | * | 4/2007  | Jayaram et al. ............... 703/22 |
| 2005/0089822 | A1 | * | 4/2005 | Geng .......................... 433/215 |

* cited by examiner

*Primary Examiner*—John E. Barlow, Jr.
*Assistant Examiner*—Aditya S Bhat
(74) *Attorney, Agent, or Firm*—Morris Manning Martin LLP; Tim Tingkang Xia, Esq.

(57) ABSTRACT

A system for measuring geometrical characters of a figure includes an application server (1), client computers (3), and a database (5). The application server includes: a figure inputting module (10) for inputting a figure of a workpiece and displaying the figure, which is constituted by different kinds of objects; an object filtering module (11) for filtering needless objects and keeping the objects that need to be measured, and for marking the kept objects; a measuring module (12) for measuring the marked objects and obtaining measuring results, and for recording measure paths; a program storing module (13) for storing the measure paths as a program; and a simulative demo module (14) for demonstrating the measure paths via invoking the program. A related method is also disclosed.

14 Claims, 9 Drawing Sheets

METHOD AND SYSTEM FOR MEASURING GEOMETRICAL CHARACTERS OF A FIGURE

BACKGROUND OF THE INVENTION

1. Field of the Invention

The present invention relates to measuring systems and methods, and more particularly to a system and method for measuring geometrical characters of a figure.

2. General Background

Product quality has long been one of the most important factors in maintaining a typical manufacturing enterprise's competitiveness. How to improve the quality of products is an important ongoing pursuit of such enterprise. It is essential to verify the correctness and accuracy of components of various assembled products. With more and more manufactured products becoming increasingly complex, the burden of verification is growing correspondingly. There is now a burgeoning need to verify components of products rapidly and precisely. Nevertheless, many enterprises still perform verification by employing numerous manual tasks and test programs that are non-standard. This can slow down output, and can seriously affect the accuracy and consistency of the verification performed.

In recent years, with the performance of computer hardware and software continually improving and with the prices of such equipment becoming more competitive, computers play a major role in the process of verification. Computer equipment can greatly improve the efficiency and accuracy of verification. The art of analyzing and processing data on an object is disclosed in patents such as U.S. Pat. No. 6,738,727, entitled System and Method for Analyzing and Processing Data on an Object. This invention can automatically measure the object and be helpful to guide production by comparing the measurement data with the design data. The system comprises an automatic scanning and measuring subsystem for obtaining point cloud data by scanning the object and generating measurement data on the object by processing the point cloud data.

Even though the system can scan and measure the objects quickly, however, the accuracy of measuring is low and manual measurement consumes much time, which would influence the processing efficiency. Furthermore, the probe of the measuring machine is so spinous that the user may be injured during the process of measuring.

What is needed, therefore, is a system and method which can measure the workpiece via measuring geometrical characters of a figure corresponding to the workpiece, and recording the measuring process as a program, through which other workpieces with the same kind of the above workpiece can be measured automatically via invoking the program.

SUMMARY

A system for measuring geometrical characters of a figure in accordance with a preferred embodiment includes an application server, a plurality of client computers, and a database. The application server includes: a figure inputting module for obtaining a figure of a workpiece and for displaying the figure, which is constituted by different kinds of objects; an object filtering module for deleting needless objects and keeping the objects that need to be measured, and for marking the kept objects; a measuring module for measuring the marked objects and obtaining measuring results, and for recording measure paths when measuring the marked objects; a program storing module for storing the measure paths as a program; and a simulative demo module for demonstrating the measure paths via invoking the program, and for analyzing the measure paths to improve the program.

A computer-based method for measuring geometrical characters of a figure in accordance with another preferred embodiment includes the steps of: obtaining a figure of a workpiece; displaying the figure, which is constituted by different kinds of objects; keeping objects to be measured and deleting the other kinds of objects; marking the kept objects; measuring the marked objects; determining whether any mistake occurs during the measuring process; recording measure paths while measuring the marked objects if no mistake occurs during the measuring process; storing the recorded measure paths as a program; and demonstrating the measure paths by invoking the program.

Other advantages and novel features of the present invention will become more apparent from the following detailed description of preferred embodiments when taken in conjunction with the accompanying drawings, in which:

DETAILED DESCRIPTION OF THE INVENTION

Figure 1:
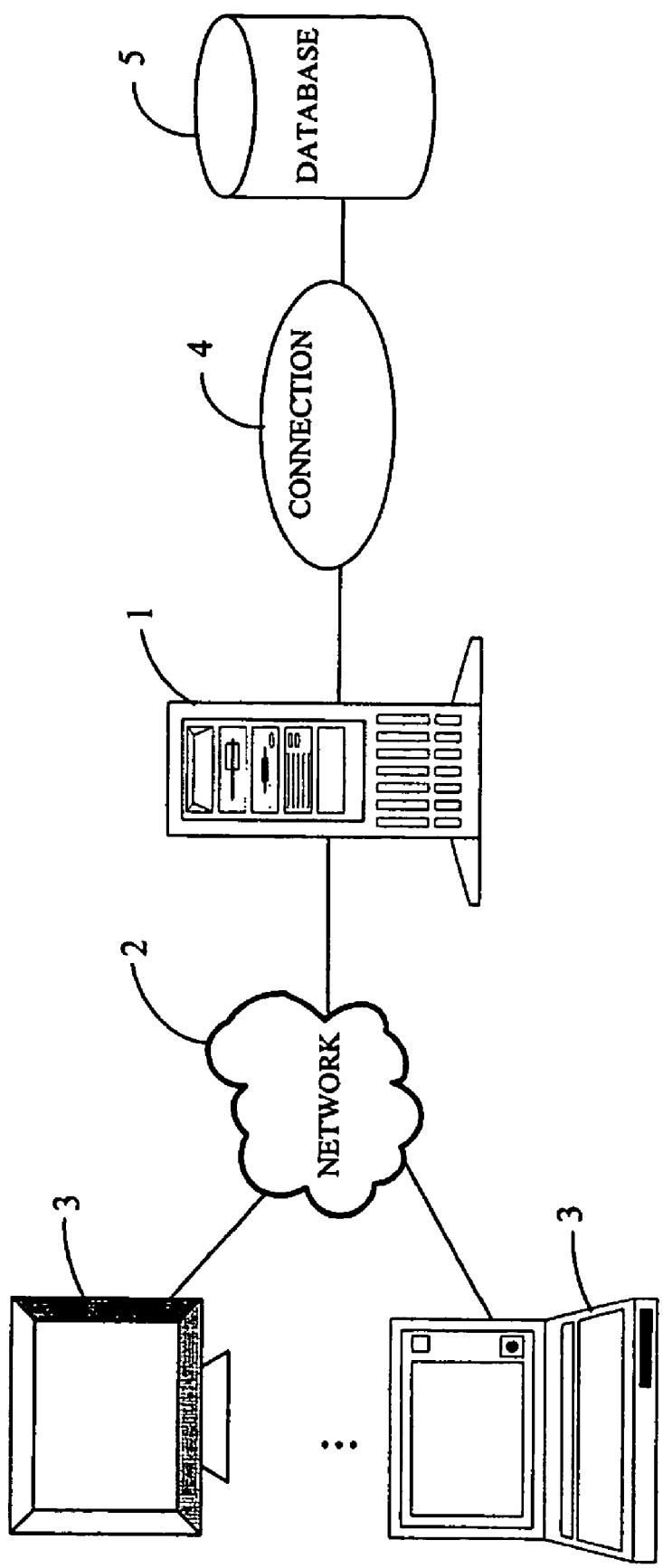
FIG. 1 is a schematic diagram of hardware configuration of a system for measuring geometrical characters of a figure in accordance with a preferred embodiment of the present invention.

FIG. 1 is a schematic diagram of hardware configuration of a system for measuring geometrical characters of a figure (hereinafter, "the system") in accordance with a preferred embodiment of the present invention. The system includes an application server 1, a plurality of client computers 3 (only two shown), and a database 5. The application server 1 communicates with the client computers 3 via a network 2. The network 2 may be an intranet, the Internet, or any other suitable type of communications link. The application server 1 is connected with the database 5 via a connection 4. The connection 4 is a database connectivity, such as an ODBC (Open Database Connectivity) or a JDBC (Java Database Connectivity).

The application server 1 is used for obtaining figures, measuring geometrical characters in the figures, and demonstrating the measuring process. The application server 1 has had a plurality of software function modules installed therein for processing the measurement. The client computers 3 are located at various places of an organization operating the system. Users in the organization can access the application server 1 via any of the client computers 3, and obtain measuring results. The database 5 is provided for storing the figures of various workpieces to be measured.

Figure 2:
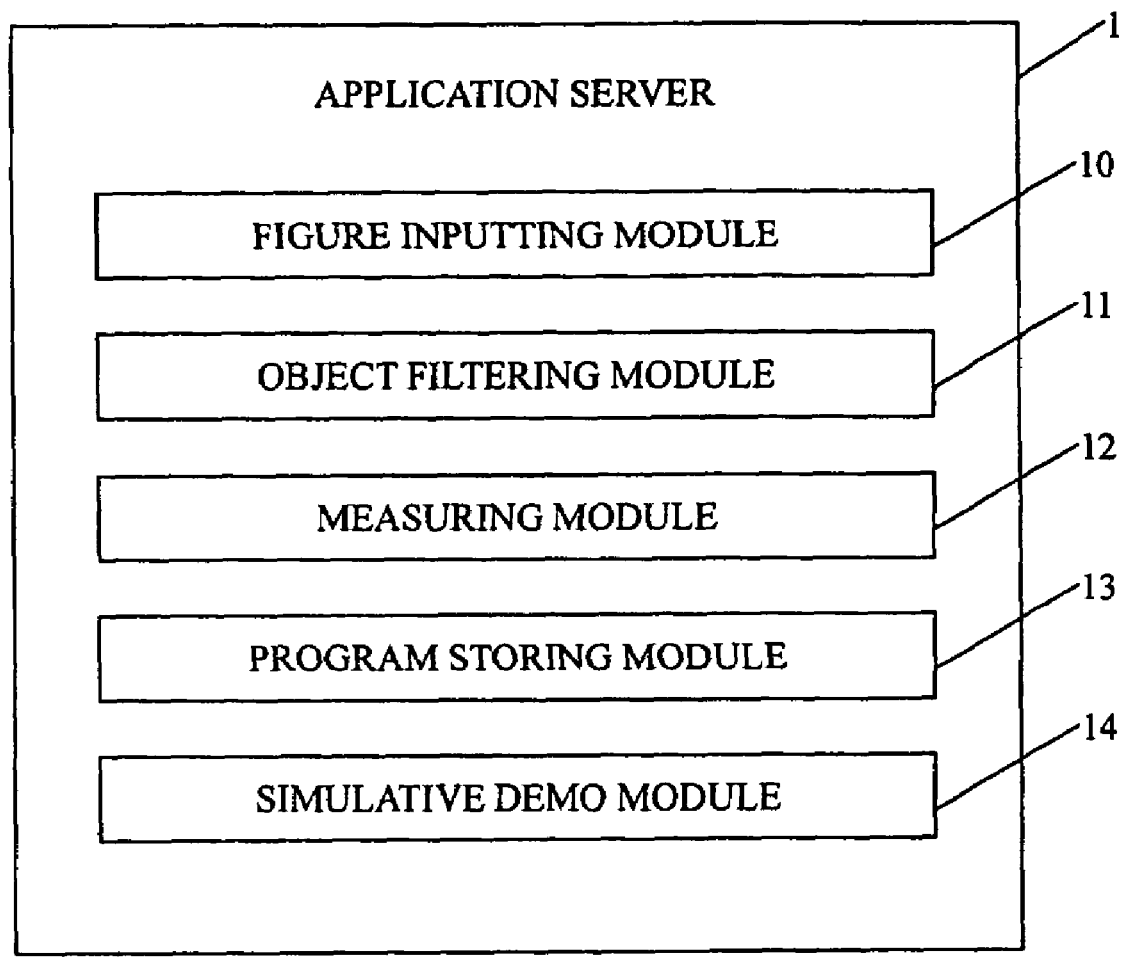
FIG. 2 is a schematic diagram of main software function modules of an application server of the system of FIG. 1.

FIG. 2 is a schematic diagram of main software function modules of an application server 1. The application server 1 includes a figure inputting module 10, an object filtering module 11, a measuring module 12, a program storing module 13, and a simulative demo module 14.

The figure inputting module 10 is used for obtaining designed information of a figure of a workpiece to be measured from the database 5 or any client computer 3. The figure inputting module 10 is also used for displaying the figure on an output device of any client computer 3. The figure is typically constituted by different kinds of objects, such as two-dimension objects and three-dimension objects. The two-dimension objects may include points, lines, circles, arcs, etc., and the three-dimension objects include columns, spheres, etc.

The object filtering module 11 is used for deleting needless objects and keeping the objects that need to be measured. The object filtering module 11 is also used for marking the kept objects. For example, the object filtering module 11 keeps two-dimension objects and three-dimension objects, and deletes other kinds of objects. Then, the object filtering module 11 marks the kept objects. Furthermore, the object filtering module 11 displays or hides the marked objects according to different user demands.

The measuring module 12 includes a plurality of function sub-modules (described in detail below in relation to FIG. 3), and is used for measuring marked objects and obtaining measuring results. The measuring module 12 is also used for recording measure paths when measuring the marked objects of the figure.

The program storing module 13 is used for storing the measure paths as a program, which can be invoked by any measuring machine to automatically measure a workpiece corresponding to the figure. The simulative demo module 14 is used for demonstrating the measure paths via invoking the program, and for analyzing the measure paths to improve the program.

Figure 3:
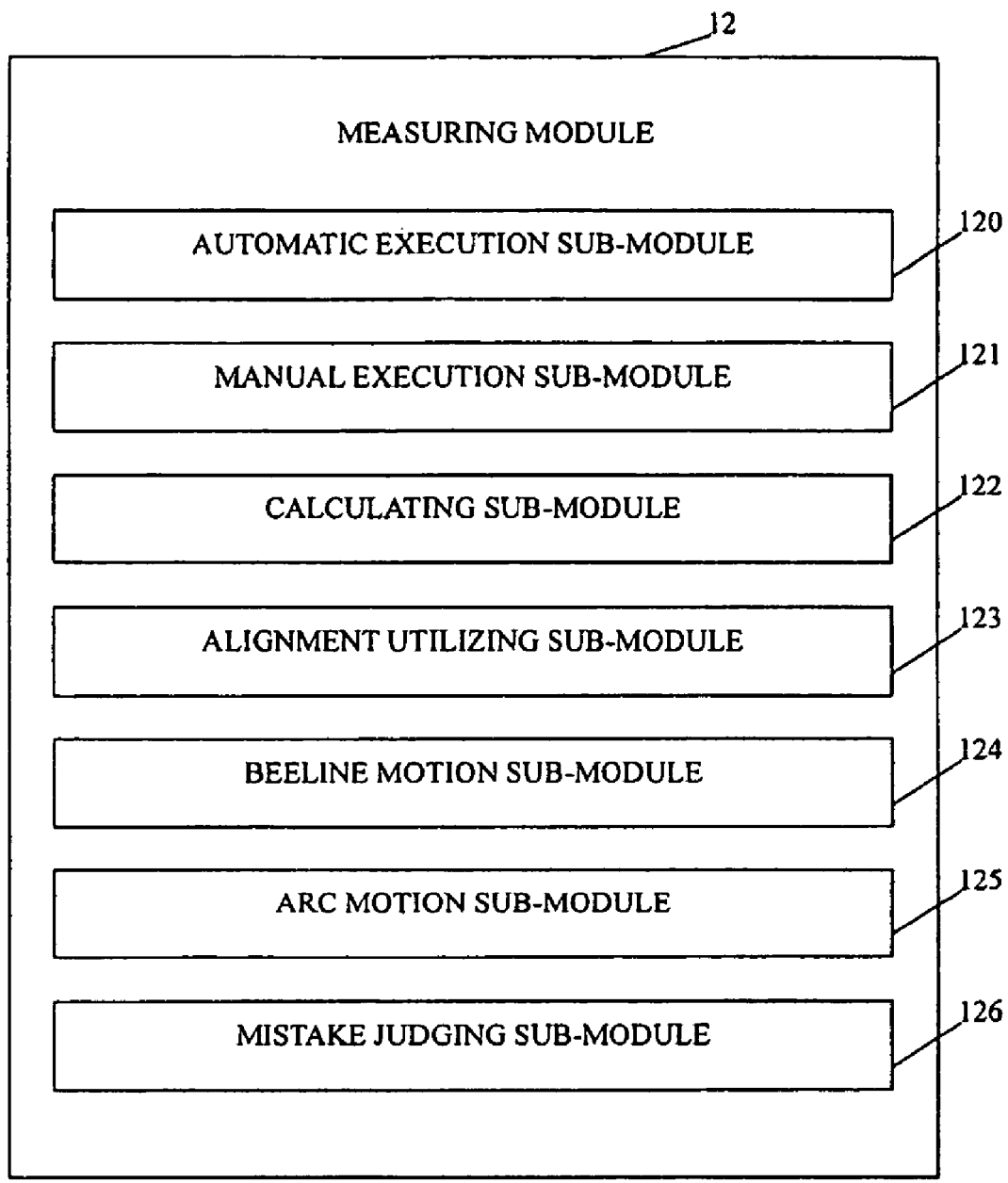
FIG. 3 is a schematic diagram showing function sub-modules of a measuring module of the application server of FIG. 2.

FIG. 3 is a schematic diagram showing function sub-modules of the measuring module 12. The measuring module 12 includes an automatic execution sub-module 120, a manual execution sub-module 121, a calculating sub-module 122, an alignment utilizing sub-module 123, a beeline motion sub-module 124, an arc motion sub-module 125, and a mistake judging sub-module 126. The automatic execution sub-module 120 is used for measuring the marked objects automatically according to sequences of geometrical characters drawn in the figure, and for returning measuring results. The manual execution sub-module 121 is used for measuring the marked objects manually according to user demands, and for returning measuring results. The calculating sub-module 122 is used for calculating all kinds of parameters in the measuring process. The alignment utilizing sub-module 123 is used for aligning objects to determine one or more measuring directions.

After an object that needs to be measured is determined, the user may select to measure the object automatically or manually by using the beeline motion sub-module 124 or the arc motion sub-module 125. The beeline motion sub-module 124 and the arc motion sub-module 125 are respectively used for measuring the object via a beeline motion or an arc motion while invoking the calculating sub-module 122 to calculate corresponding parameters. The parameters may include coordinates of a start point and an end point, a radius and a center of the arc, measuring speed and so on. The mistake judging sub-module 126 is used for determining whether any mistake occurs during the measuring process, and for prompting the mistake and resuming the measuring process if any mistake exists.

Figure 4:
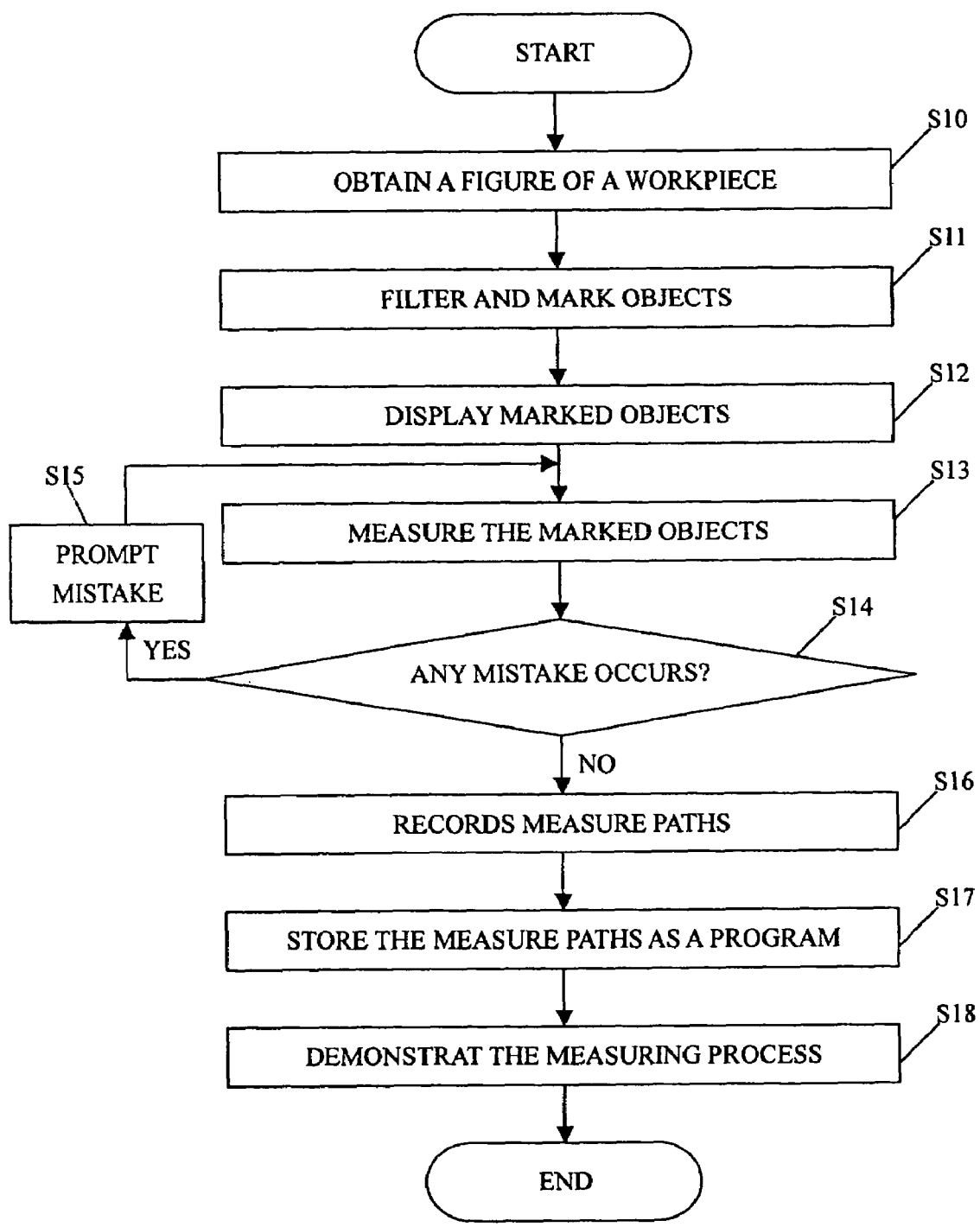
FIG. 4 is a flowchart of a method for measuring geometrical character in accordance with a preferred embodiment of the present invention.

FIG. 4 is a flowchart of a method for measuring geometrical characters of a figure in accordance with a preferred embodiment of the present invention. In step S10, the figure inputting module 10 obtains a figure of a workpiece that needs to be measured from the database 5, and displays the figure on an output device of a client computer 3. In step S11, the object filtering module 11 keeps two-dimension objects and three-dimension objects of the figure, and deletes other objects. Then, the object filtering module 11 marks the two-dimension objects and the three-dimension objects (described in detail in relation to FIG. 5). In step S12, the object filtering module 11 displays the marked objects (described in detail in relation to FIG. 6). In step S13, the manual execution sub-module 121 measures the marked objects that need to be measured (described in detail in relation to FIG. 7). The marked objects may be points, lines, arcs, circles and so on. In step S14, the mistake judging sub-module 126 determines whether any mistake occurs during the measuring process. If any mistake occurs, in step S15, the mistake judging sub-module 126 prompts the mistake, whereupon the procedure returns to step S13 described above. Otherwise, if no mistake occurs, in step S16, the measuring module 12 records measure paths while measuring the marked objects. In step S17, the program storing module 13 stores the recorded measure paths as a program. In step S18, the simulative demo module 14 demonstrates the measure paths by invoking the program. The program may be modified and improved by analyzing the measure paths during the simulative demo.

Figure 5:
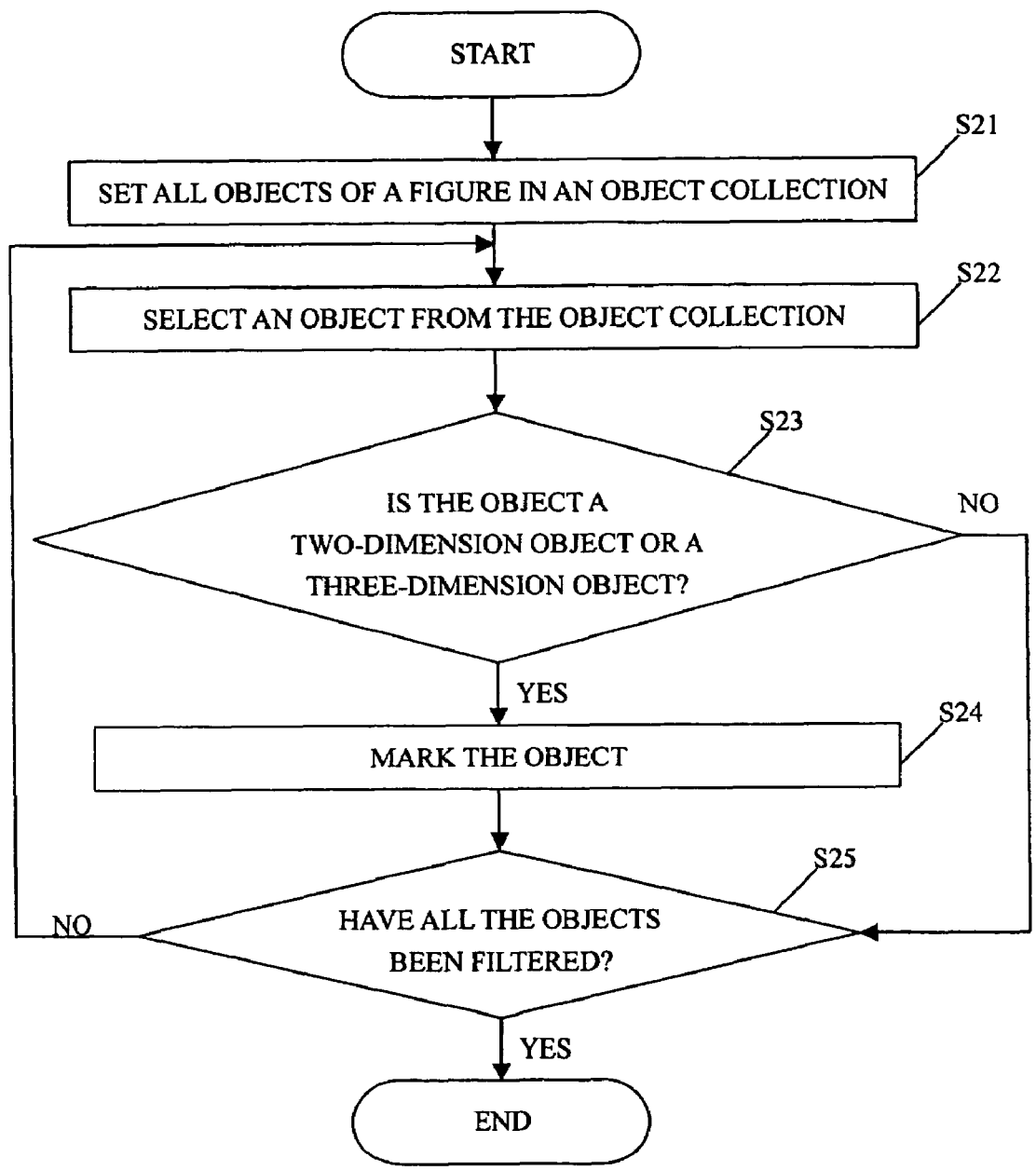
FIG. 5 is a flowchart illustrating one step of FIG. 4 in detail, namely filtering and marking objects.

FIG. 5 is a flowchart illustrating one step of FIG. 4 in detail, namely Step S11 of filtering and marking objects. In step S21, after the figure inputting module 10 obtains the figure from the database 5 and displays the figure on an output device of a client computer 3, the object filtering module 11 set all objects of the figure in an object collection. In step S22, the object filtering module 11 selects an object from the object collection. In step S23, the object filtering module 11 determines whether the object is a two-dimension object or a three-dimension object. If the object is not a two-dimension object nor a three-dimension object, the procedure goes directly to step S25 describe below. Otherwise, if the object is a two-dimension object or a three-dimension object, in step S24, the object filtering module 11 marks the object. In step S25, the object filtering module 11 determines whether all the objects have been filtered. If any object has not been filtered, the procedure goes back to step S22 described above. If all the objects have been filtered, the procedure ends.

Figure 6:
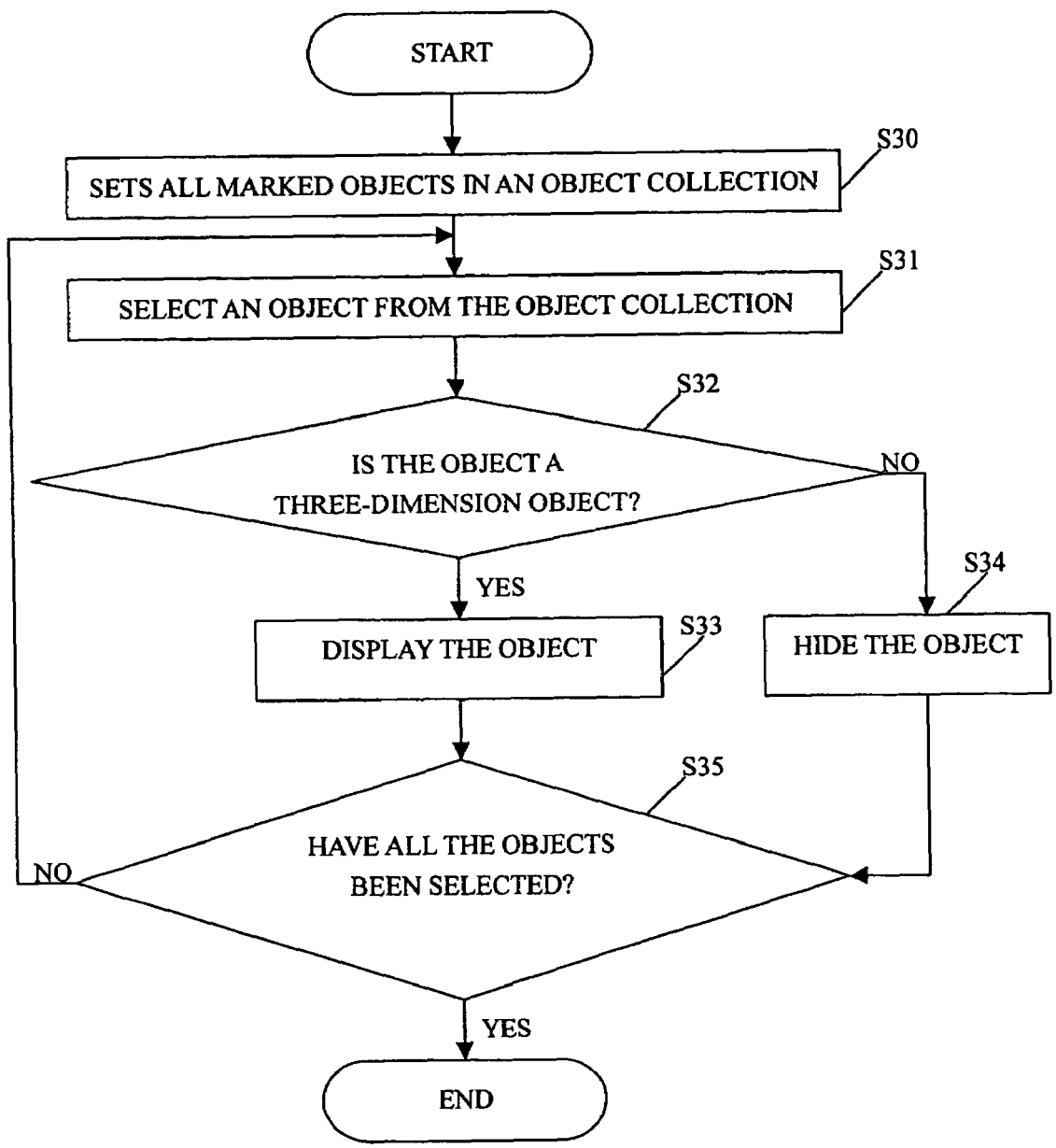
FIG. 6 is a flowchart illustrating another step of FIG. 4 in detail, namely displaying marked objects.

FIG. 6 is a flowchart illustrating another step of FIG. 4 in detail, namely step S12 of displaying marked objects. In step S30, after the object filtering module 11 have filtered all the objects of the figure, and marked the two-dimension objects and the three-dimension objects, the object filtering module 11 sets all the marked objects in an object collection. In step S31, the object filtering module 11 selects an object from the object collection. In step S32 the object filtering module 11 determines whether the object is a three-dimension object. If the object is a three-dimension object, in step S33, the object filtering module 11 displays the object and the procedure goes directly to step S35 describe below. Otherwise, if the object is not a three-dimension object, in step S34, the object filtering module 11 hides the object. In step S35, the object filtering module 11 determines whether all the objects have been selected. If any object has not been selected, the procedure goes back to step S31 described above. If all the objects have been selected, the procedure ends. This flow is also applicable to display all two-dimension objects and hides other objects.

Figure 7:
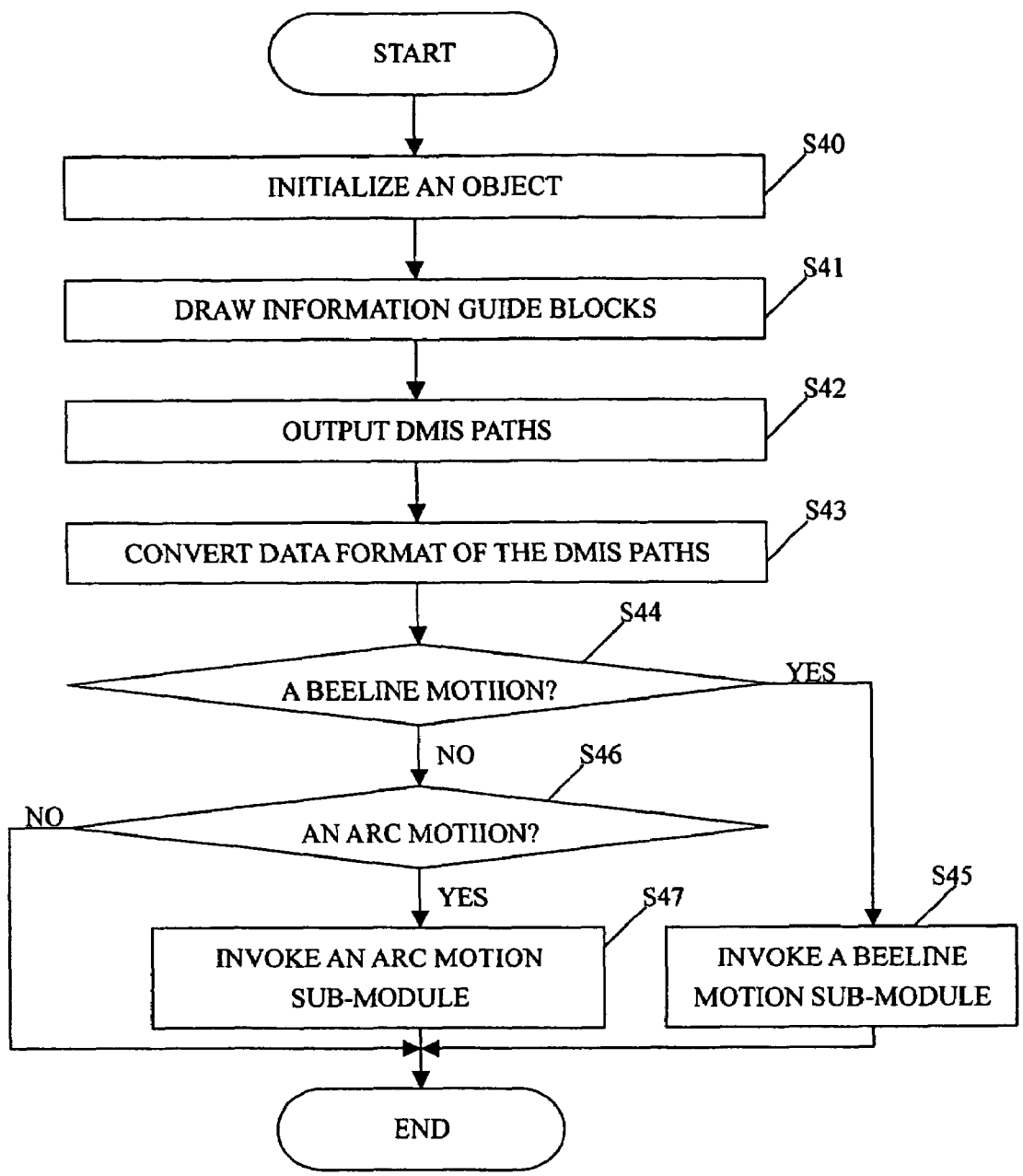
FIG. 7 is a flowchart illustrating another step of FIG. 4 in detail, namely measuring the marked objects.

FIG. 7 is a flowchart illustrating another step of FIG. 4 in detail, namely step S13 measuring the marked objects. In step S40, the user initializes an object that needs to be measured in the figure by selecting some points in the object and confirming the coordinates of the points. In step S41, the application server 1 draws information guide blocks of the corresponding object. Each information guide block at least includes a derivation line, an arrowhead, a tolerance, a dimension, and a measuring value. The application server 1 names each information guide block automatically. The names can be differentiated according to serial numbers. Furthermore, the information guide block can be displayed in the figure. In step S42, the calculating sub-module 122 outputs DMIS (Dimensional Measurement Interface Specification) paths, which may include an object name, a motion type of measurement, a normal direction of motion, and the number of measuring points etc. In step S43, the calculating sub-module 122 converts the data format of the DMIS paths into a measure path that is recognizable by the system.

In step S44, the measuring module 12 determines whether the measure path is a beeline. If the measure path is a beeline, in step S45, the beeline motion sub-module 124 measures the object via a beeline motion. Otherwise, if the measure path is not a beeline, in step S46, the measuring module 12 determines whether the measure path is an arc. If the measure path is an arc, in step S47, the arc motion sub-module 125 measures the object via an arc motion. Otherwise, if the measure path is not an arc, the procedure ends.

Figure 8:
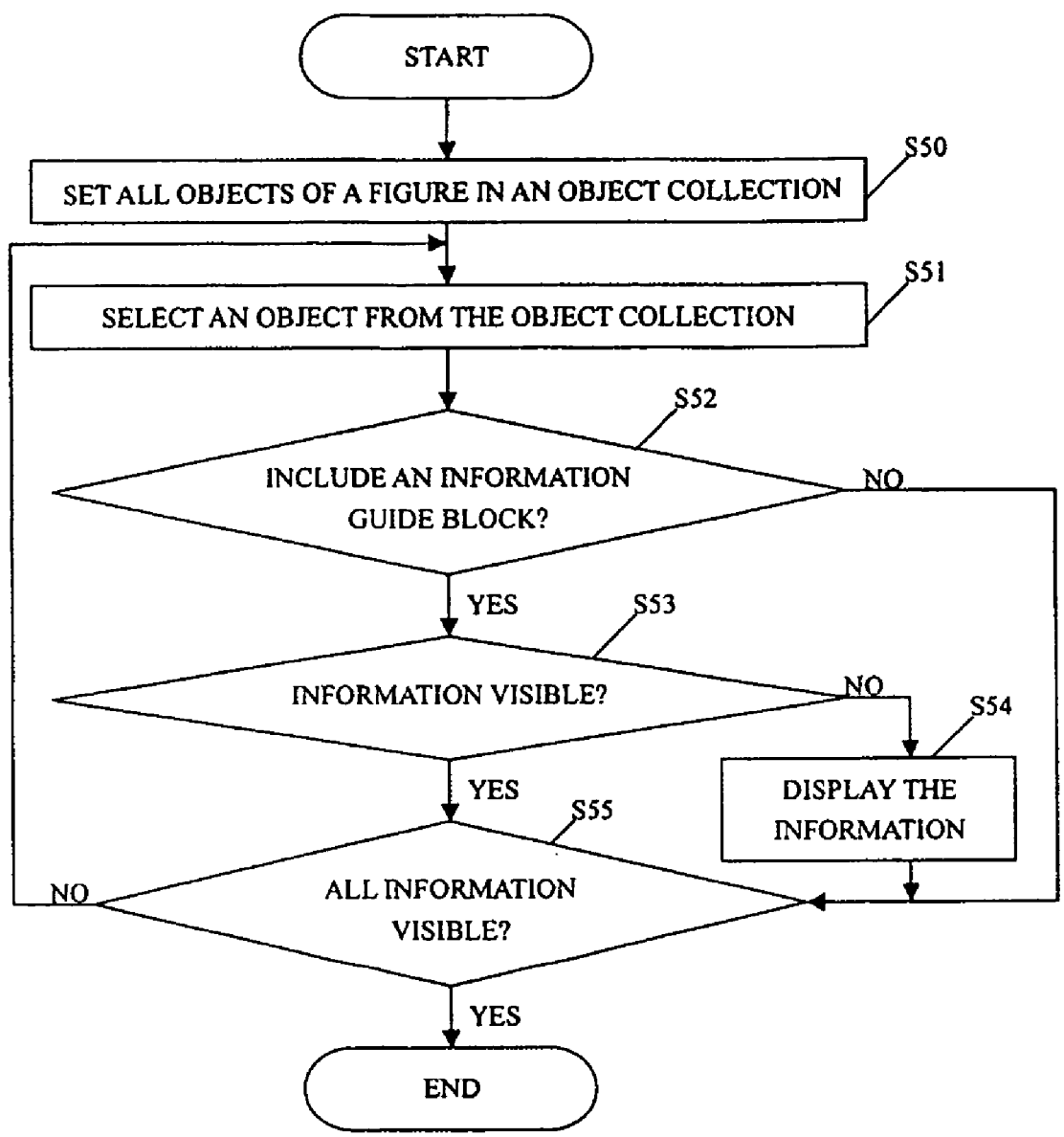
FIG. 8 is a flowchart of a method for displaying information included in a information guide block in accordance with a preferred embodiment of the present invention.

FIG. 8 is a flowchart of a method for displaying information included in the information guide block in accordance with a preferred embodiment of the present invention. In step S50, the object filtering module 11 set all objects of the figure in an object collection. In step S51, the object filtering module 11 selects an object from the object collection. In step S52, the object filtering module 11 determines whether the object includes an information guide block. If the object does not include an information guide block, the procedure goes directly to step S55 describe below. Otherwise, if the object includes an information guide block, in step S53, the application server 1 determines whether the information included in the information guide block is visible. If the information is not visible, in step S54, the application server 1 displays the information in the figure. Otherwise, if the information is visible, in step S55, the object filtering module 11 determines whether all information of the information guide blocks of the objects are visible. If any information is not visible, the procedure goes back to step S51 described above. If all information is visible, the procedure ends. Furthermore, this flow is also applicable to hide the information of the information guide block or to disassemble the information to help user analyze needful information.

Figure 9:
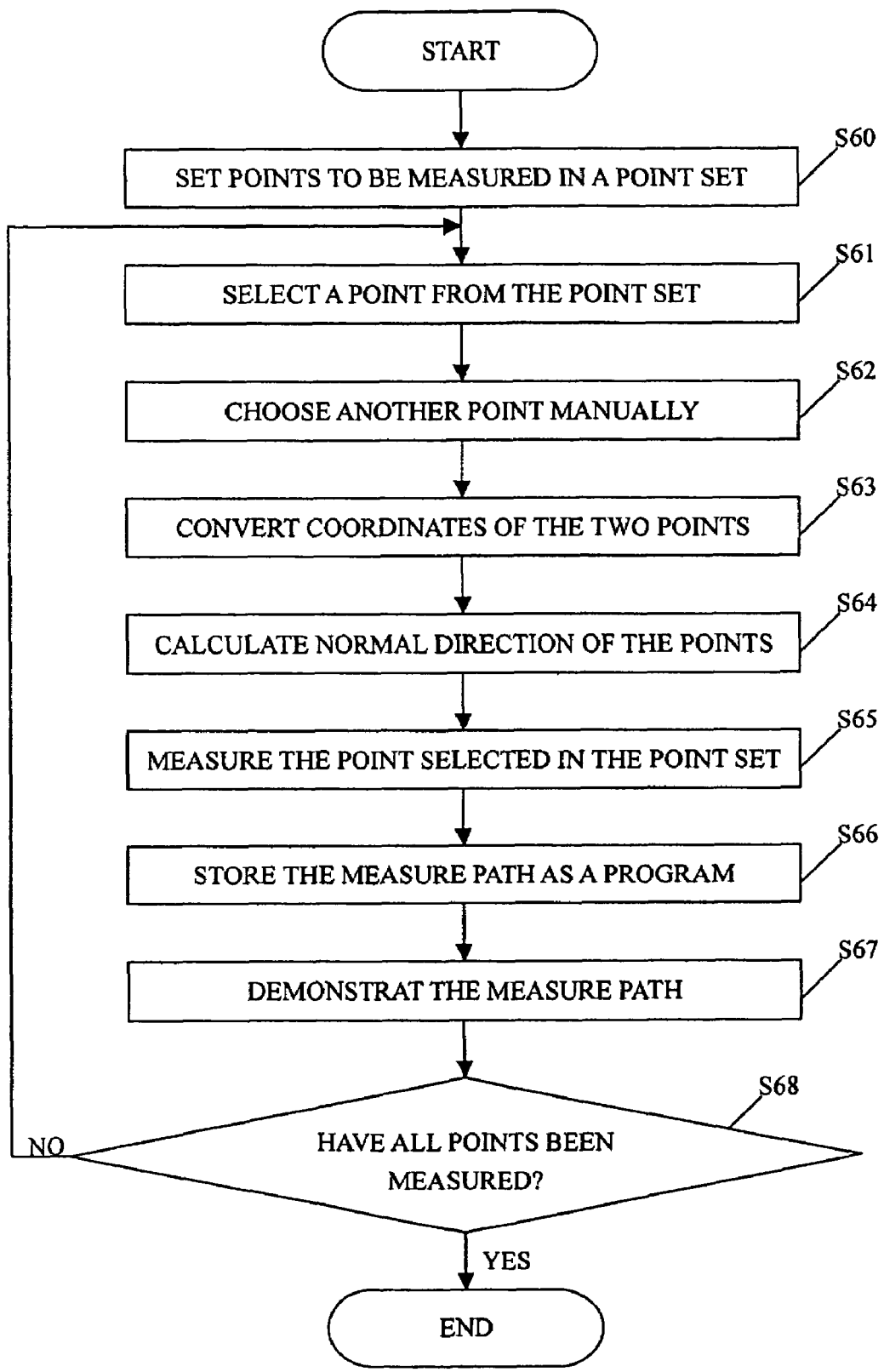
FIG. 9 is a flowchart of a preferred method for measuring points by utilizing the method of FIG. 4.

FIG. 9 is a flowchart of a preferred method for measuring points by utilizing the method of FIG. 4. In step S60, after the figure inputting module 10 obtains a figure from the database 5 and the object filtering module 11 have filtered all objects, the object filtering module 11 sets the points need to be measured in a point set. In step S61, the object filtering module 11 selects a point from the point set. In step S62, the user chooses another point manually, which does not belong to the point set, and the calculating sub-module 122 confirms a direction of the point. In step S63, the calculating sub-module 122 converts coordinates of the above two points in an MCS (Machine Coordinates System) to coordinates in the current coordinates system. In step S64, the calculating sub-module 122 calculates a normal direction of the above two points. In step S65, the measuring module 12 measures the selected point (described in detail in relation to FIG. 7) and records measure paths. In step S66, the program storing module 13 stores the recorded measure paths as a program. In step S67, the simulative demo module 14 demonstrates the measure paths by invoking the program. In step S68, the object filtering module 11 determines whether all the points in the point set have been measured. If any point has not been measured, the procedure goes back to step S61 described above. If all the points have been measured, the procedure ends.

The flowchart described above is applicable to measure lines, planes, circles, cubes, cylinders and other objects of the figure. Measurement of the above objects is implemented by measuring multiple measuring points on the above objects, wherein the measuring points are selected according to measurement requirements or user demands.

Although the present invention has been specifically described on the basis of a preferred embodiment and a preferred method, the invention is not to be construed as being limited thereto. Various changes or modifications may be made to said embodiment and method without departing from the scope and spirit of the invention.

We claim:

1. A system for measuring geometrical characters of a figure, the system comprising an application server, the application server comprising:
   a figure inputting module for obtaining a figure of a workpiece and for displaying the figure, which is constituted by different kinds of objects;
   an object filtering module for deleting needless objects and keeping the objects that need to be measured, and for marking the kept objects;
   a measuring module for measuring the marked objects and obtaining measuring results, and for recording measure paths when measuring the marked objects, wherein the measuring module comprises a calculating sub-module for outputting DMIS (Dimensional Measurement Interface Specification) paths, and converting a data format of the DMIS paths into the measure paths; and
   a program storing module for storing the measure paths as a program, which is invoked for automatically measuring other workpieces of the same kind as the workpiece.

2. The system as claimed in claim 1, wherein the measuring module comprises an automatic execution sub-module for measuring the marked objects automatically according to sequences of geometrical characters drawn in the figure, and for returning measuring results.

3. The system as claimed in claim 1, wherein the measuring module comprises a manual execution sub-module for measuring the marked objects manually according to user requests, and for returning measuring results.

4. The system as claimed in claim 1, wherein the measuring module comprises an alignment utilizing sub-module for aligning the objects of the figure to determine one or more measuring directions.

5. The system as claimed in claim 1, wherein the measuring module comprises:
   a beeline motion sub-module for measuring the objects via a beeline motion; and
   an arc motion sub-module for measuring the objects via an arc motion.

6. The system as claimed in claim 1, wherein the measuring module comprises a mistake judging sub-module for determining whether any mistake occurs during the measuring process, and for prompting the mistake and resuming the measuring process if a mistake exists.

7. The system as claimed in claim 1, wherein the measuring module comprises a simulative demo module for demonstrating the measure paths via invoking the program.

8. A computer-based method for measuring geometrical characters of a figure, comprising the steps of:
- obtaining a figure of a workpiece;
- displaying the figure, which is constituted by different kinds of objects;
- keeping objects to be measured and deleting the other kinds of objects;
- marking the kept objects;
- measuring the marked objects, comprising the steps of:
- initializing the marked objects and confirming measuring points of the marked objects and coordinates of the measuring points;
- outputting DMIS (Dimensional Measurement Interface Specification) paths and converting a data format of the DMIS paths into a measure path; and
- determining a motion type of the measure path and invoking a corresponding motion;
- determining whether any mistake occurs during the measuring process;
- recording measure paths while measuring the marked objects if no mistake occurs during the measuring process; and
- storing the recorded measure paths as a program, which is invoked for automatically measuring other workpieces of the same kind as the workpiece.

9. The method according to claim 8, further comprising the step of:
- prompting the mistake if any mistake occurs during the measuring process.

10. The method according to claim 8, further comprising the step of:
- demonstrating the measure paths by invoking the program.

11. The method according to claim 8, wherein the step of measuring the marked objects further comprises the step of:
- drawing information guide blocks of the marked objects.

12. The method according to claim 8, wherein the motion type comprises at least one of a beeline motion and an arc motion.

13. A method for verifying and measuring geometrical characters of a workpiece figure, comprising the steps of:
- retrieving design information of a workpiece figure;
- simulatively displaying said workpiece figure according to said information;
- identifying measurable objects from said information of said workpiece figure;
- measuring said identified objects by means of measuring said simulative display of said workpiece figure, comprising the steps of:
- initializing said identified objects and confirming measuring points of said identified objects and coordinates of said measuring points;
- outputting DMIS (Dimensional Measurement Interface Specification) paths and converting a data format of said DMIS paths into a measure path; and
- determining a motion type of said measure path and invoking a corresponding motion;
- recording measure paths for measuring said identified objects so as to provide said measure paths for actual measurement; and
- recording said measure paths as an executable program, which is invoked for automatically measuring other workpiece figures of the same kind as said workpiece figure.

14. The method according to claim 13, further comprising the step of correcting any mistake during said measuring step.

* * * * *